(12) United States Patent
Cope

(10) Patent No.: US 7,803,335 B1
(45) Date of Patent: Sep. 28, 2010

(54) REMOTE BRINE TANK FOR COMMERCIAL WATER SOFTENERS

(75) Inventor: Benjamin W. Cope, Lancaster, PA (US)

(73) Assignee: Cope Company Salt, Lancaster, PA (US)

( * ) Notice: Subject to any disclaimer, the term of this patent is extended or adjusted under 35 U.S.C. 154(b) by 985 days.

(21) Appl. No.: 11/601,160

(22) Filed: Nov. 17, 2006

(51) Int. Cl.
*B01D 11/02* (2006.01)

(52) U.S. Cl. .................. 422/275; 422/279; 422/902

(58) Field of Classification Search ............. 422/279, 422/275, 902; 105/377.07; 3/279, 275
See application file for complete search history.

(56) References Cited

U.S. PATENT DOCUMENTS 1,015,397 A * 1/1912 Posson .............. 105/377.07
2,987,380 A * 6/1961 Brumbaugh et al. ....... 422/106

OTHER PUBLICATIONS

Undated drawing used in a sales brochure for the Cope Company Salt Autobrine System to depict typical construction.

* cited by examiner

*Primary Examiner*—Elizabeth L McKane
(74) *Attorney, Agent, or Firm*—Miller Law Group, PLLC

(57) ABSTRACT

A brine tank provides a supply of brine to a commercial water softening system that is located remotely from the brine tank. Fresh water is delivered into the brine tank through a central header pipe from which a plurality of perforated risers extends laterally to both sides of the central header pipe. The perforated risers are located beneath the inlet opening for the delivery of loose salt, yet spaced from the brine pump so that a uniform salt concentration will be attained in the brine before being pumped to the water softener. The inlet opening for the delivery of loose salt is provided with a double leaf hatch cover to provide a receiving opening that is larger than the inlet opening into the brine tank so that loose salt can be funneled into the brine tank without significant spillage on the ground.

10 Claims, 4 Drawing Sheets

REMOTE BRINE TANK FOR COMMERCIAL WATER SOFTENERS

BACKGROUND OF THE INVENTION

The present invention relates generally to commercial water softening devices and, more particularly, to a system for supplying brine to a remote water softening system.

The inventor of the instant application, doing business as The Cope Company Salt, has developed a system for supplying large quantities of salt to commercial and industrial customers, such as schools, hospitals, manufacturing facilities, nursing homes, hotels, etc. This system includes the burying of a large brine tank at a site away from the building in which the commercial or industrial water conditioning system is located. The remote brine tank is then connected to the water conditioning system with a brine line through which a brine solution would be delivered into the water conditioning system on demand via a pump. The water conditioning tank is provided with a sensor that indicates a low level of brine within the system, whereupon the pump is signaled to pump brine solution from the brine tank into the water conditioning system to a suitable supply level.

The brine tank is also connected to a fresh water supply at the building so that as the brine solution is pumped to the water conditioning system the brine solution can be replenished. Distribution of the fresh water within the brine tank is problem as a uniform concentration of salt within the brine is desired. The brine tank is formed with at least one fill tube that extends upwardly from the main tank to a manhole cover that is accessible above ground level. Salt is delivered to the brine tank by a large truck hauling loose salt which dumps the loose salt through the manhole cover into the brine tank through the open fill tube. Directing the loose salt being delivered into the relatively small open manhole frame is also problematic. Typically, any loose salt that is spilled over the surface of the ground is swept into the open manhole frame to be added to the supply of salt delivered into the brine tank.

Between the supply of fresh water and renewed supplies of loose salt into the brine tank, the brine solution can be replenished. The brine tank is sized for delivery of a known quantity of loose salt on a pre-established schedule that is defined by the normal salt utilization rates. For example, the rate of salt usage will deplete a normal truck load of salt within a predicted number of days; therefore, the delivery schedule will provide a truck load of loose salt on a regular periodic basis separated by the predicted number of days. The commercial or industrial customer would pay for the loose salt delivered.

Conventional methods of supplying salt for commercial and industrial water conditioning systems prior to the development of the above-described system includes the delivery of many bags of salt into a warehouse which may be adjacent to or remote from the water conditioner for which the salt is to be supplied. A worker would carry the salt bags to the water conditioning unit, open the salt bag and dump the contents into the brine tank of the water conditioning unit. This process would be repeated until the requisite volume of salt was supplied into the water conditioning unit. This method of supplying salt is extremely labor intensive and subjects the worker to muscle strain and injury climbing steps, carrying bags, and dumping salt from the opened bags. Furthermore, if proper attention was not paid to the level of salt in the water conditioning unit, the water conditioning unit could run out of salt, resulting in the water conditioning unit malfunctioning.

Accordingly, it would be desirable to provide a scale mechanism that could be mounted on a truck for delivering loose material to a consumer's place of business and used to weigh and quickly dispense loose material being dispensed from the delivery truck.

SUMMARY OF THE INVENTION

It is an object of this invention to overcome the aforementioned disadvantages of the known prior art remote brine systems by providing a brine tank that provides for better collection of the loose salt being delivered into the brine tank and provides for a more even distribution of fresh water into the interior of the brine tank.

It is another object of this invention to provide a fresh water delivery system that provides a uniform distribution of fresh water into the interior of the brine tank.

It is a feature of this invention that the fresh water is delivered into a header pipe from which multiple perforated risers extend to distribute fresh water throughout the brine tank.

It is another feature of this invention that the perforated risers are spaced from the stillwell in which the brine pump is located to delivered brine to the remotely located water softening system.

It is an advantage of this invention that the brine will attain a uniform salt concentration before being pumped out of the stillwell to the remote water softening system.

It is another feature of this invention that the perforated risers are positioned beneath the inlet opening through which loose salt is delivered into the brine tank.

It is still another feature of this invention that the perforated risers extend laterally to both sides of a centrally located header pipe and follow the curved exterior contours of the brine tank.

It is another advantage of this invention that the inlet opening for the delivery of loose salt into the brine tank is located near the center of the brine tank.

It is still another object of this invention to provide a access into the brine tank that will facilitate the delivery of loose salt therein.

It is still another feature of this invention that the inlet opening through which loose salt is delivered into the brine tank is provided with a watertight double leaf hatch cover.

It is yet another feature of this invention that the double leaf hatch cover opens laterally to direct the flow of loose salt into the inlet opening of the brine tank.

It is still another advantage of this invention that the delivery of loose salt into the brine tank through the opened double leaf hatch cover is directed into the brine tank inlet opening without being subjected to spillage.

It is yet another feature of this invention that the double leaf hatch cover forms a funnel structure to direct the flow of loose salt from a large receiving opening formed by the double leaf hatch cover into a smaller inlet opening into the brine tank.

It is yet another object of this invention to provide a remote brine system for use in conjunction with commercial water softener systems that is durable in construction, inexpensive of manufacture, carefree of maintenance, facile in assemblage, and simple and effective in use.

These and other objects, features and advantages are accomplished according to the instant invention by providing a brine tank that is operable to provide a supply of brine to a commercial water softening system that is housed remotely from the brine tank. Fresh water is delivered into the brine tank through a central header pipe from which a plurality of perforated risers extends laterally to both sides of the central header pipe. The perforated risers are located beneath the inlet opening for the delivery of loose salt, yet spaced from the brine pump so that a uniform concentration of salt will be attained in the brine before being pumped to the water softener. The inlet opening for the delivery of loose salt is provided with a double leaf hatch cover to provide a receiving opening larger than the inlet opening into the brine tank so that loose salt can be funneled into the brine tank without significant spillage on the ground.

BRIEF DESCRIPTION OF THE DRAWINGS

The foregoing and other objects, features, and advantages of the invention will appear more fully hereinafter from a consideration of the detailed description that follows, in conjunction with the accompanying sheets of drawings. It is to be expressly understood, however, that the drawings are for illustrative purposes and are not to be construed as defining the limits of the invention.

DETAILED DESCRIPTION OF THE PREFERRED EMBODIMENT

Referring to FIGS. 1-4, a remote brine system incorporating the principles of the instant invention and being operable to supply brine to a commercial water softening system can best be seen. The water softening system 10 is preferably housed in a building B where the water is to be softened. The water softening system 10 is referred to as being a commercial system 10 primarily because residential water softening systems are not typically operable to produce enough volume of soft water to justify the expenditure of a remote brine system. However, the principles of the instant invention can also be applied to residential water softening systems.

Figure 1:
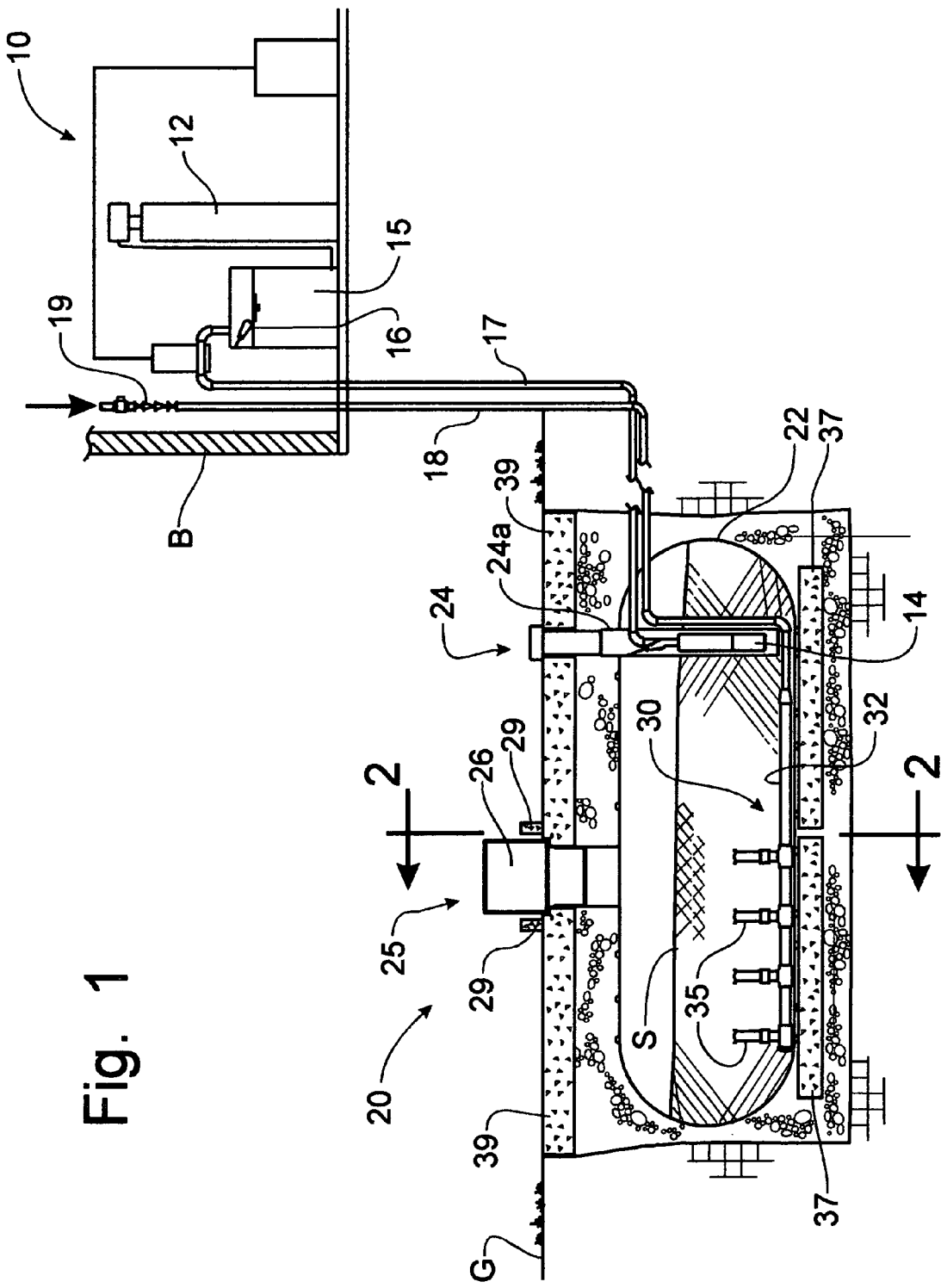
FIG. 1 is an elevational view of a remote brine tank system incorporating the principles of the instant invention to provide a supply of brine to a commercial water softening system located a distance away from the brine tank system, the fresh water and brine lines interconnecting the water softening system and the brine tank system being broken to reflect a variable distance between the water softener and the brine tank.

The commercial water softening system 10 is schematically depicted in FIG. 1 as including a water softener 12 coupled to an associated brine container 15 having a float switch 16 operable to indicate the volume of brine within the container 15. A brine line 17 connects the remote brine tank system 20 with the brine container 15 associated with the commercial water softener 12. When the float switch 16 indicates a low volume of brine in the container 15, a fresh supply of brine is pumped from the remote brine tank system 20. When the float switch 16 indicates that a sufficient supply of brine has been received within the container 15, the flow of brine from the remote system 20 is halted.

Figure 4:
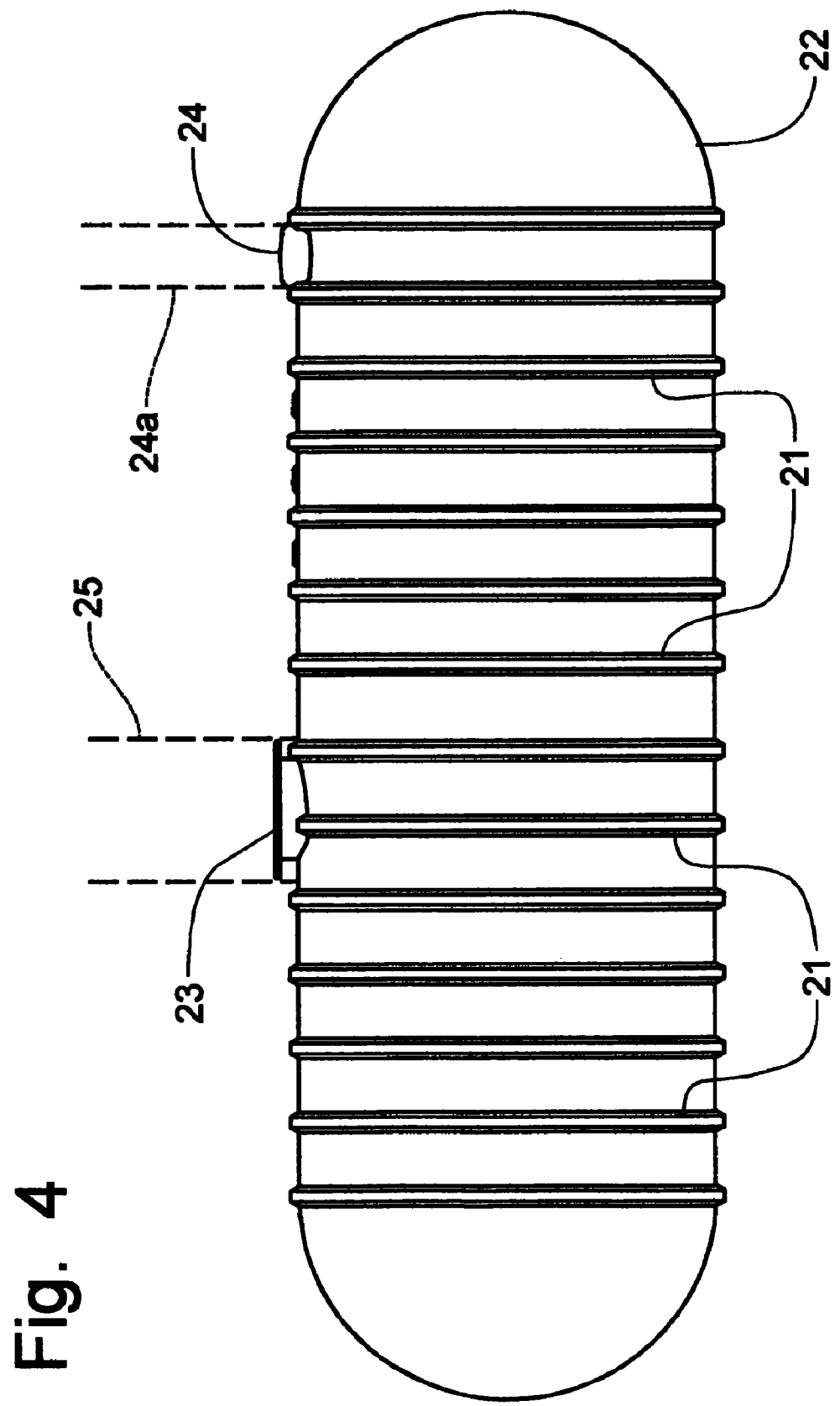
FIG. 4 is an elevational view of the exterior of the brine tank depicted in FIGS. 1 and 2.

The remote brine tank system 20 is preferably buried into the ground G outside of the building B in which the commercial water softening system 10 is located. Alternatively, the brine system 20 could be positioned above ground provided that adequate measures are taken to prevent the fresh water lines, described in greater detail below, from freezing and to deliver loose salt to the inlet opening, as will also be described in greater detail below. Typically, the brine system 20 will include a brine tank 22 preferably formed of an eight foot diameter, eight thousand gallon capacity, single wall fiberglass underground storage tank 22. The tank 22 is formed with a loose salt inlet opening 23 and a stillwell access opening 24. The inlet opening 23 is located generally centrally along the length of the tank 22, though preferably offset slightly away from the stillwell access opening. The exterior surface of the tank 22, as is represented in FIG. 4, is preferably formed with reinforcing ribs 21 to increase the wall strength of the tank 22.

Figure 2:
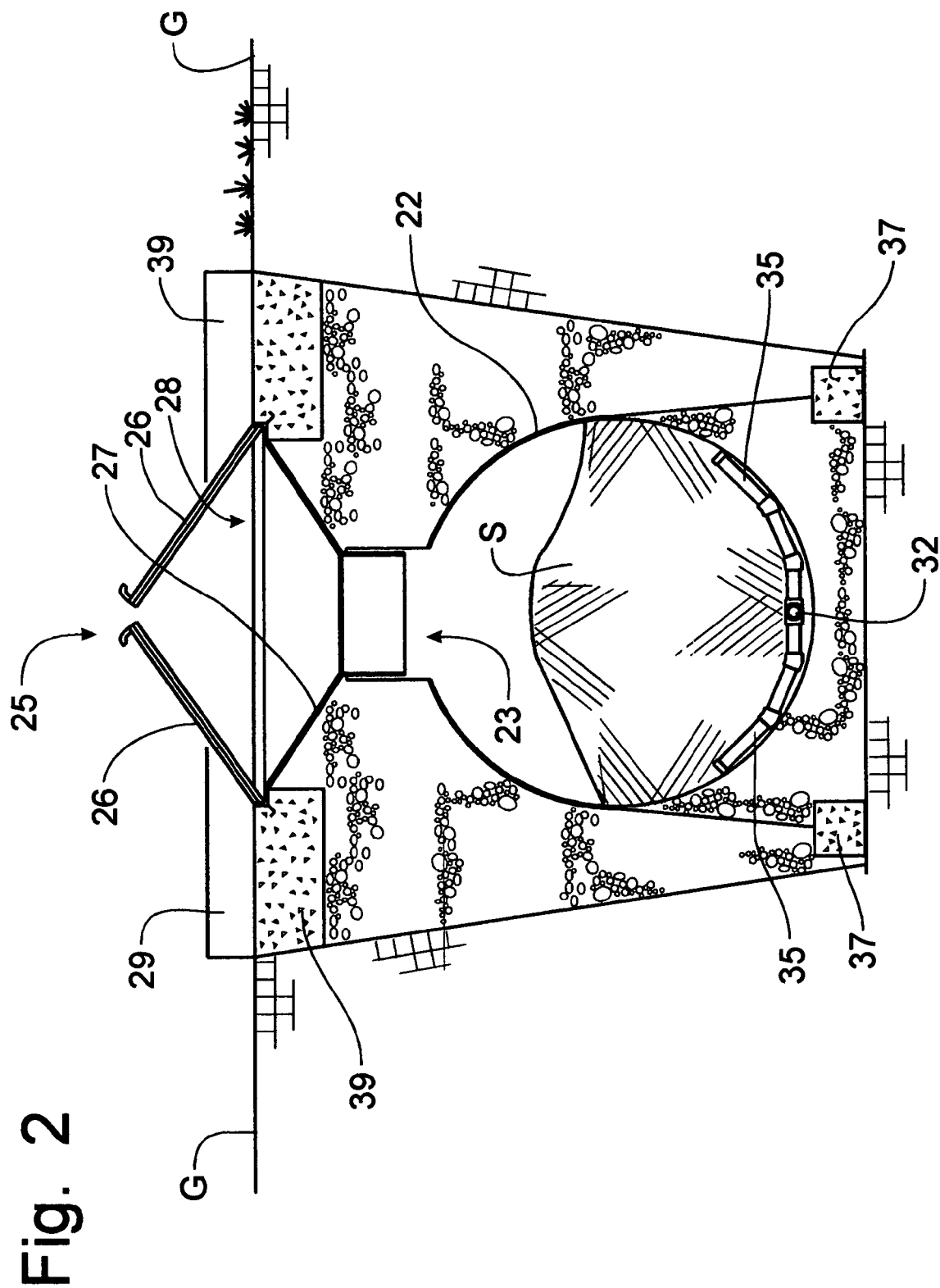
FIG. 2 is a cross-sectional view of the brine tank system taken along lines 2-2 of FIG. 1, the doors of the double leaf hatch cover being shown as partially opened, as the doors are depicted in FIG. 1.
Figure 3:
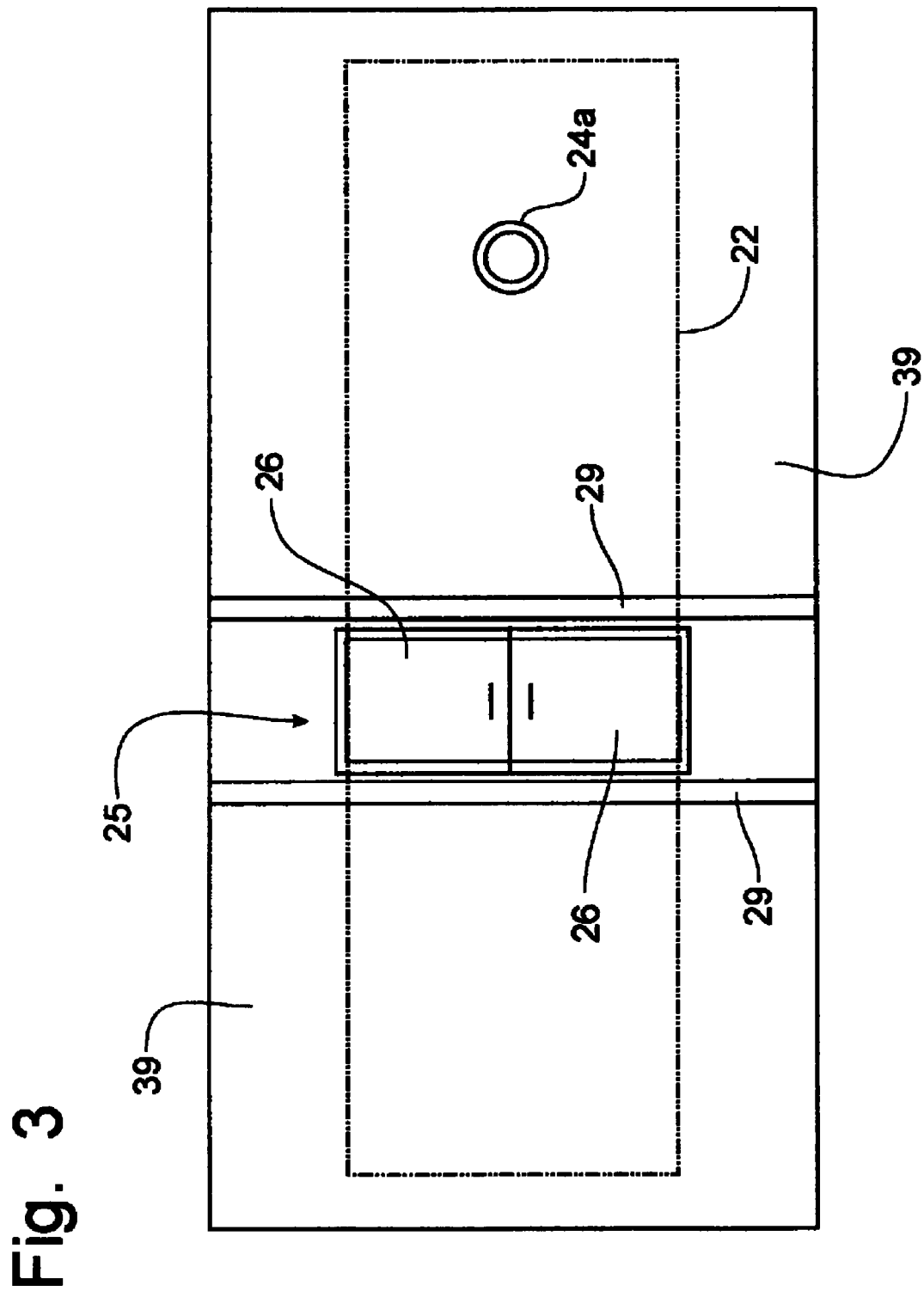
FIG. 3 is a top plan view of the brine tank system shown in FIG. 1, the brine tank being depicted in phantom.

The tank 22 is preferably buried below the surface of the ground G and encased in quarter inch pea gravel. The loose salt inlet opening 23 is connected to a watertight double leaf hatch cover 25 that has a pair of ground level access doors 26 that pivotally open to a funnel structure 27 that directs the flow of loose salt delivered through the receiving opening 28 at the hatch cover 35 into the smaller inlet opening 23, as is best depicted in FIG. 2. In the way of an example, the receiving opening 28 is preferably a three feet by eight feet rectangular opening from which the funnel structure directs the loose salt into a thirty inch diameter inlet opening 23 in the tank 22. A concrete curb 29 can be provided on opposing sides of the hatch cover 25, as is depicted in FIGS. 1-3. By increasing the size of the receiving opening 28, the delivery of loose salt into the tank 22 is less subject to spillage than has been previously known.

Loose salt S is contained within the interior of the tank 22. The delivery of loose salt into the tank 22 is scheduled on a regular basis and is based on the predicted usage of the salt by the water softening system 10. Thus, the delivery person has a reasonable expectation as to how much loose salt is to be delivered into the tank 22 at each scheduled delivery. Once the predicted amount of loose salt has been delivered, or the predicted amount is close to being delivered, the delivery person can shine a light into the inlet opening 23 of the tank 22 to see if the level of the loose salt supply S is at a satisfactory height.

Fresh water is pumped into the interior of the tank 22 through a fresh water line 18 supplied from the building B or other appropriate supply of fresh water. A backflow preventer 19 is preferably mounted on the fresh water line 18 to prevent the backflow of brine from the tank 22 into the building B through the fresh water line 18 due to some malfunction involving water pressures. A float switch within the stillwell signals the need for additional fresh water to be added to the tank 22. The addition of fresh water to the interior of the tank 22 will create brine by the dissolving of the loose salt S into the fresh water. Salt will only dissolve to the saturation point. Thus, the addition of fresh water into the tank 22 will only deplete a certain amount of the salt S as brine is continuously created with the pumping of fresh water into the tank 22. The brine is delivered to the brine container 15 through the brine line 17 by a pump 14 positioned within a stillwell 24a extending from the surface of the ground G into the tank 22 to prevent loose salt S from being engaged by the pump 14. Brine in the stillwell 24a, however, will reach the level of the brine within the tank 22, thus permitting the liquid brine to be pumped into the container 15.

Fresh water is distributed within the interior of the tank 22 by a distribution apparatus 30 that includes a central header pipe 32 connected to the fresh water inlet line 18. Extending laterally to both sides of the central header pipe 32 are a plurality of perforated risers 35 that are spaced along the length of the header pipe 32 and follow the curved surface of the interior of the tank 22, as is best seen in FIG. 2. The perforated risers 35 are positioned along the bottom of the tank 22 at the half of the tank 22 most distal from the stillwell 24a so that the fresh water being delivered into the tank 22 by the distribution system 30 will have ample opportunity to become saturated with salt to form brine before reaching the stillwell 24a. Since the inlet opening 23 is offset slightly from center away from the stillwell 24a, the risers 35 become positioned beneath the largest volume of loose salt S within the tank 22. In the way of an example, the header pipe is preferably a two inch diameter PVC pipe with the risers also being two inch diameter PVC pipe with one-eighth inch holes drilled on six inch centers, with the risers having a capped end.

Typical installation of the brine system 20 is accomplished by first digging a hole of sufficient size into the surface of the ground G. A concrete deadman 37 or two may be positioned on opposing sides of the location of the tank 22 at the bottom of the hole, as required by local regulations to keep the tank 22 within the ground. Each concrete deadman 37 is ultimately connected to the tank 22 by straps extending over top of the tank 22 to the opposing concrete deadman 37. A layer of pea gravel is placed at the bottom of the hole so that the tank 22 will not be sitting directly on the undisturbed ground at the bottom of the hole. The tank 22 having the fresh water distribution apparatus 30 installed therein can then be placed into the hole on top of the first layer of pea gravel. The brine and fresh water lines 17, 18 would then be connected to the tank 22 from the building B.

Pea gravel is then placed into the hole around the tank 22 so that the tank 22 becomes encased in the pea gravel. Before completely filling the hole with pea gravel, the stillwell 24a and the double leaf hatch cover 25 are mounted to the access opening 24 and the inlet opening 23, respectively. The last layer of pea gravel is then placed into the hole to a depth within twelve inches of the surface of the ground. A twelve-inch concrete slab 39 is then poured on top of the pea gravel and around the hatch cover 25 and the stillwell 24 to provide a surface on which a delivery truck providing a supply of loose salt S to the tank 22 can travel without damaging the tank 22 within the hole.

The invention of this application has been described above both generically and with regard to specific embodiments. Although the invention has been set forth in what is believed to be the preferred embodiments, a wide variety of alternatives known to those of skill in the art can be selected within the generic disclosure. For example, the use of air cylinders 3, 28 could be replaced by hydraulic cylinders coupled to a hydraulic system supported and operated through the truck 1. The invention is not otherwise limited, except for the recitation of the claims set forth below.

What is claimed is:

1. A brine system for supplying brine to a remote water softening system, comprising:
    a tank having a loose salt inlet opening and a stillwell access opening spaced from said loose salt inlet opening, said stillwell access opening being offset from a center of said tank such that said stillwell access opening is located in one half of said tank and said loose salt inlet opening is located in the opposing half of said tank;
    a brine pump supported within a stillwell extending into said tank through said stillwell access opening, said brine pump being coupled to a brine line to deliver a supply of brine therethrough to said water softening system; and
    a fresh water distribution apparatus positioned within said tank and including a header pipe connected to a fresh water supply line and a plurality of perforated risers connected to said header pipe, said perforated risers being positioned only within said opposing half of said tank beneath said loose salt inlet opening.

2. The brine system of claim 1 wherein said perforated risers extend laterally on both opposing sides of said header pipe which is located generally centrally within said tank.

3. The brine system of claim 2 wherein said loose salt inlet opening has a double leaf hatch cover in flow communication therewith.

4. The brine system of claim 3 wherein said hatch cover has a receiving opening that is larger than said loose salt inlet opening in said tank, said hatch cover including funnel structure operable to direct loose salt into said loose salt inlet opening for introduction into said tank.

5. The brine system of claim 4 wherein said tank is buried below the surface of the ground, said hatch cover including pivoted doors that move into an open position to expose said receiving opening.

6. The brine system of claim 5 wherein said receiving opening has a dimension greater than twice the diameter of said inlet opening, said receiving opening being rectangular while said inlet opening is circular, said funnel structure interconnecting said receiving opening and said inlet opening to direct loose salt into said tank.

7. The brine system of claim 1 wherein said risers follow an interior surface of said tank.

8. A remote brine system for a commercial water softening system to provide a continuous supply of brine to said commercial water softening system, comprising:
    a tank having a loose salt inlet opening and a stillwell access opening spaced from said loose salt inlet opening, said loose salt inlet opening and said stillwell access opening being located on opposing halves of said tank;
    a stillwell extending from said access opening into said tank;
    a brine pump supported within said stillwell, said brine pump being coupled to a brine line to deliver a supply of brine therethrough to said water softening system;
    a fresh water distribution apparatus positioned within said tank and including a header pipe connected to a fresh water supply line and a plurality of perforated risers connected to said header pipe, said risers being positioned only on said half of said tank corresponding to said loose salt inlet opening; and
    a double leaf hatch cover mounted on said loose salt inlet opening to define a receiving opening that is larger than said loose salt inlet opening, said hatch cover having a pair of pivoted doors movable to an open position to expose said receiving opening, said hatch cover including a funnel structure to direct loose salt from said receiving opening to said loose salt inlet opening.

9. The brine system of claim 8 wherein said perforated risers extend laterally on both opposing sides of said header pipe which is located generally centrally within said tank, said risers being configured to follow an interior surface of said tank.

10. The brine system of claim 9 wherein said loose salt inlet opening is offset from a center point of said tank away from said stillwell, said perforated risers being positioned within one half of said tank most distal from said stillwell and beneath said loose salt inlet opening.

* * * * *